United States Patent
Schulze et al.

[11] Patent Number: 5,927,721
[45] Date of Patent: Jul. 27, 1999

[54] AXIALLY DIRECTED BRUSH SEAL FOR ROTOR-STATOR ARRANGEMENTS

[75] Inventors: Gisbert Schulze, Dachau; Bernhard Woehrl, Gauting, both of Germany

[73] Assignee: MTU-Motoren- und Turbinen-Union Muenchen GmbH, Munich, Germany

[21] Appl. No.: 08/963,556

[22] Filed: Nov. 3, 1997

[30] Foreign Application Priority Data

Nov. 2, 1996 [DE] Germany .................. 196 45 163

[51] Int. Cl.$^6$ .................................................. F01D 11/18
[52] U.S. Cl. ............................................................ 277/355
[58] Field of Search .................................. 277/355, 409, 277/412, 433; 415/174.2, 174.5

[56] References Cited

U.S. PATENT DOCUMENTS

| | | | |
|---|---|---|---|
| 885,032 | 4/1908 | Ferranti | 277/355 X |
| 4,781,388 | 11/1988 | Wohrl et al. | 277/355 |
| 5,181,728 | 1/1993 | Stec | 277/355 |
| 5,474,306 | 12/1995 | Bagepalli et al. | 277/355 |
| 5,769,428 | 6/1998 | Rypalla | 277/355 X |

FOREIGN PATENT DOCUMENTS

| | | |
|---|---|---|
| 3514382 | 6/1986 | Germany . |
| 3720069 | 12/1987 | Germany . |
| 3828833 | 3/1990 | Germany . |
| 3907614 | 9/1990 | Germany . |
| 3828363 | 2/1992 | Germany . |
| 19527781 | 9/1996 | Germany . |
| 3125081 | 5/1991 | Japan . |
| 3209068 | 9/1991 | Japan . |
| 1541001 | 2/1979 | United Kingdom . |

*Primary Examiner*—Lynne A. Reichard
*Assistant Examiner*—Greg Binda
*Attorney, Agent, or Firm*—W. F. Fasse; W. G. Fasse

[57] ABSTRACT

A brush seal (3) is provided to seal two differently pressurized spaces ($R_1$, $R_2$) on opposite sides of a rotor (1) cooperating with a stator (2), for example in a gas turbine engine, around a circumferential gap between the rotor (1) and the stator (2). The brush seal (3) includes seal bristles (5) having free ends extending annularly concentrically and parallel to a rotation axis of the rotor (1) and fixed ends received in a seal housing (6). A perimeter rim of the rotor (1) has an axis-concentric circumferential groove (7) therein, and the free ends of the seal bristles (5) reach into this circumferential groove (7). During operation of the rotor (1), fluid boundary layers are formed respectively between the seal bristles (5) and the side walls (9A, 9B) of the circumferential groove (7). The boundary layers ($G_I$, $G_A$) cause the seal bristles (5) to float up out of contact with and substantially centered between the side walls of the circumferential groove (7), and also enhance the seal effect. The axis-parallel orientation of the bristles (5) reduces the radial height of the seal arrangement, and ensures that good radial compensation is still achieved.

24 Claims, 2 Drawing Sheets

AXIALLY DIRECTED BRUSH SEAL FOR ROTOR-STATOR ARRANGEMENTS

FIELD OF THE INVENTION

The invention relates to an arrangement for sealing the circumferential gap between two differently pressurized spaces on opposite sides of a rotor-stator arrangement, and particularly a brush seal arrangement including seal bristles arranged concentrically around the rotor axis between the stator and the rotor.

BACKGROUND INFORMATION

A brush seal arrangement of the above mentioned general type is known in the art, for example from German Patent Laying Open Document 3,907,614, in which a brush seal is fixedly, i.e. non-rotationally, secured to the stator, while the bristles extend toward and into the circumferential gap between the rotor and the stator so as to concentrically surround the rotor axis.

Brush seals are predominantly used in turbine machines, and especially gas turbine engines, to provide a seal with the minimum possible leakage at circumferential gaps, for example between a machine housing and rotor or around a rotary shaft of the turbine machine, between two spaces having different prevailing fluid pressures within the turbine machine. Generally, the bristles of the brush seal are held and guided so as to be elastically yieldable or movable in order to compensate for any eccentric or oscillation motions of the rotor or shaft relative to the housing, which may result, for example, from rotor imbalances or the like. To achieve this, the brush seal bristles are generally oriented in a substantially radial direction so that the bristles can deflect or bend laterally to achieve the above mentioned compensating effect.

In this context, brush seals have been recognized as advantageous over the previously long utilized labyrinth seals, because such labyrinth seals can only adapt themselves to eccentric shaft movements to a very limited degree. Furthermore, brush seals advantageously distinguish themselves over prior labyrinth seals by their insensitivity to various contaminants that might be present in the fluid medium that is to be sealed, by their lower production costs, and by their lower total weight.

In rotor-stator arrangements having only a very small radial space available in which a brush seal is to be installed, it has been problematic or even impossible to use the previously known brush seals having radially directed seal bristles, due to their relatively great radial structural height and corresponding radial installation space requirements. In this context, if it is simply attempted to shorten the length of the bristles in order to reduce the radial space requirement, difficulties arise because the flexibility of the bristles and thus the compensating yieldability of the brush seal is lost. In order to avoid this problem, yet still reduce the radial dimension of a seal, German Patent Laying-Open Document 3,828,833 discloses an arrangement using a seal ring that is supported or mounted on elastically flexible rods or spring elements arranged coaxially around the rotor. A fixed end of the respective rods is secured to the stator, while a free end of the respective rods carries the seal ring that is arranged coaxially about the rotor. This seal ring, together with the circumferential surface of the rotor, forms a seal gap as a primary seal. It is disadvantageous in this known arrangement, that a seal ring is still needed to achieve the seal, and that a relatively great effort is required for securing the fixed ends of the flexible rods in the stator and the other ends in the seal ring.

SUMMARY OF THE INVENTION

In view of the above it is an object of the invention to provide a brush seal arrangement of the above mentioned general type for sealing a circumferential gap in a rotor-stator arrangement, whereby the seal arrangement has a small radial installation dimension and requires only a small effort and complexity of installation, especially as compared to the prior art seal arrangements. Further objects of the invention are to avoid or overcome the disadvantages of the prior art, and to achieve additional advantages, as apparent from the present description.

The above objects have been achieved in a brush seal arrangement according to the invention, wherein the seal bristles are all directed essentially parallel to the axial direction of the rotor, the rotor has a circumferential groove formed therein concentrically with the rotor axis, and the free ends of the brush seal bristles extend into the circumferential groove. Further according to the invention, the seal bristles are so embodied and adapted such that they are relatively close to or in contact with one circumferential side wall or surface of the groove in the rotor when the rotor is at a standstill, yet float away from that circumferential side wall or surface of the groove when the rotor is in operation so that the seal is achieved in a contact-less manner. In order to achieve this, the dimensions, material characteristics, configuration, contact force, and especially the flexibility or spring characteristic of the bristles are adapted depending on the physical characteristics of the fluid that flows through the rotor-stator arrangement, and depending on the operating parameters of the rotor-stator arrangement, so that the above described floating tendency counteracting the natural elastic urging force of the bristles is achieved.

The invention provides the advantage that the brush seal has a very small radial structural height, due to the axis-parallel orientation of the bristles. Thus, the present brush seal can be used and can provide all the advantages of a brush seal, even in relatively tight or small installation spaces between the rotor and stator. Also, a high degree of sealing is achieved even in the event of radially directed relative movements between the stator and the rotor, e.g. due to imbalances, because the free ends of the bristles are received and substantially enclosed in the axis-concentric circumferential or annular groove of the rotor. This is achieved, first because the bristles are elastically flexible in the radial direction due to their axially directed orientation, and secondly because the bristle ends are received and enclosed within the circumferential groove so that the effective seal gap width is independent of any radial movements of the rotor relative to the stator or the brush seal. Instead, the effective gap width of the seal arrangement is constructively determined by the radial dimension or width of the circumferential groove, i.e. by the spacing of the two opposite walls of the groove from each other. Moreover, a very generous range of acceptable axial deflections or movements of the rotor relative to the stator is achieved by appropriately selecting the axial depth of the groove and the free axial length of the bristles.

The inventive seal arrangement especially achieves a very high blocking or sealing effect, due to the formation of at least one boundary layer of the flowing fluid in the circumferential groove during operation of the rotor. Preferably, the boundary layer is formed in a two-fold manner, namely first between the radially inner wall of the circumferential groove and the radially inner side of the bristles, and secondly between the radially outer wall of the circumferential groove and the radially outer side of the bristles. This two-fold boundary layer, in view of the kinetic energy and the kinematic viscosity of the fluid flowing through the rotor-stator arrangement, causes a deflecting effect on the seal bristles. Namely, the bristles float up on the boundary layer fluid so that the brush seal achieves its sealing effect in a contact-less manner with the bristles slightly bent or deflected and floating above the side wall surface of the circumferential groove. This seal effect is reinforced by a throttle effect or baffle effect similar to that which occurs due to the labyrinth flow in a labyrinth seal. Namely, the leakage flow must penetrate two times perpendicularly through the rotating boundary layer between the rotating walls of the circumferential groove and the seal bristles. As a result, a very good seal effect is achieved due to the strong turbulence and the energy dissipation of the leakage flow.

In order to achieve the best possible contact-free operation of the bristles within the circumferential groove, and thereby achieve the minimum wear of the parts and the optimum resulting seal effect, the seal arrangement is preferably embodied in such a manner that the bristles are relatively closer to the radially outer wall than to the radially inner wall of the circumferential groove, or are even slightly in contact with the radially outer wall of the groove, when the rotor is at a standstill. Then, when the rotor is rotating at a normal operating speed, due to the effect of the centrifugal force and the temperature expansion of the rotor, the rotor and especially the circumferential groove therein will move radially outwardly relative to the brush seal, so that the seal bristles are shifted approximately into the center of the groove between the circumferential walls thereof under normal operating conditions.

The above described centering effect is reinforced by the pressure conditions existing on the opposite sides of the bristles, as determined by the two boundary layers. It is thus also possible to arrange the brush seal in such a manner that the bristles contact one or the other side wall while the rotor is at a standstill. Due to the centering effect of the boundary layers, the seal bristles will float up and hover spaced away from both of the walls of the circumferential groove when the rotor is operating. In a further embodiment, the bristles have an elastic characteristic and/or shape tending to press the bristles toward or into contact with the radially inner wall of the circumferential groove, while the formation of boundary layers as discussed above generates a counteracting force that tends to push the seal bristles away from the radially inner wall and into a centered position in the circumferential groove.

According to particular details of the invention, the circumferential groove becomes enlarged or wider, i.e. has a greater radial dimension, toward the open side of the groove facing the brush seal. More particularly, the circumferential groove preferably includes a cylindrical groove portion immediately adjacent the closed side or base of the groove, and then a conical or curved widening portion of the groove that widens toward the open side of the groove. A further preferred detail provides that the circumferential groove further includes a second wider cylindrical groove portion between the conical groove portion and the open side of the groove. Due to the conical or curved portion of the circumferential groove which widens toward the opening of the groove, a deflection of the bristles is tolerable, so that in operation the brush seal runs in a substantially contact-free manner within the circumferential groove, whereby wear can be reduced.

This overall configuration of the groove provides good tolerance for deflection of the bristles, and also ensures that the bristles reach into and terminate with their free ends within the narrowest cylindrical portion of the groove, which achieves a symmetrical configuration of the boundary layers on both sides of the seal bristles, which in turn is advantageous for achieving the best seal effect. The formation of the boundary layers on the two sides of the bristles can be influenced so as to achieve the optimum seal effect as required for different operating conditions, by forming either the radially inner wall or the radially outer wall, or both of these walls, to have a conical widening configuration. The presence or absence of this conical configuration influences the formation of the boundary layer on the respective side.

The circumferential rims of the circumferential groove are preferably rounded off toward the outside of the groove. This feature proves advantageous for installation and repair of the brush seal arrangement, because it helps to avoid damage to the bristles or other components of the brush seal while carrying out inspections or repairs.

The fixed ends of the bristles are preferably held on one or both sides by an annular circumferential band or collar of a seal housing, which in turn is mounted on the stator. This circumferential band or collar on the one hand avoids a turbulence of the bristles when the fluid that is to be sealed impacts upon the bristles, and on the other hand achieves a deflection of the fluid into the circumferential groove, which in turn helps to achieve a high seal effect. It is advantageous for this effect that the circumferential bands reach into the circumferential groove at least during operation of the rotor. Accordingly, the circumferential groove has a sufficient radial width for receiving the circumferential bands in the area of the opening of the groove.

BRIEF DESCRIPTION OF THE DRAWINGS

In order that the invention may be clearly understood, it will now be described, in connection with an example embodiment of the invention with reference to the drawings, wherein.

DETAILED DESCRIPTION OF PREFERRED EXAMPLE EMBODIMENTS AND OF THE BEST MODE OF THE INVENTION

Figure 1:
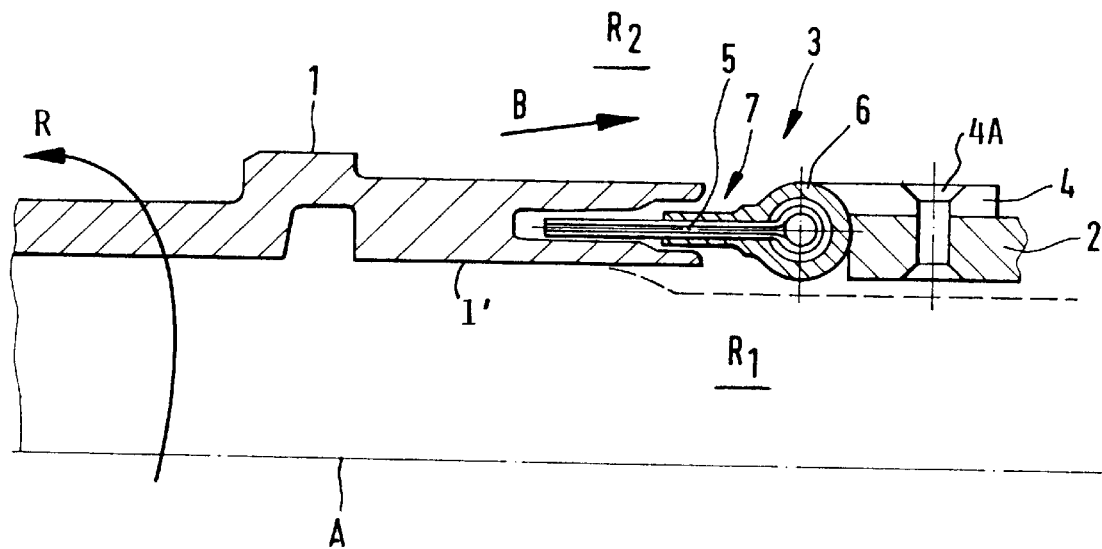
FIG. 1 is a schematic lengthwise sectional view of a portion of a rotor-stator arrangement including the brush seal according to the invention, during operation of the rotor.
Figure 2:
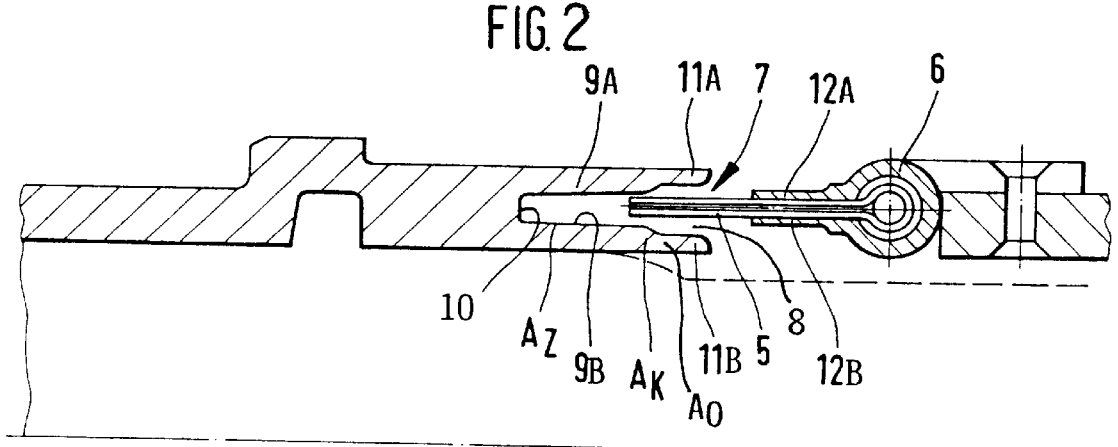
FIG. 2 is a lengthwise sectional view similar to that of FIG. 1, but showing the rotor at a standstill.

FIGS. 1 and 2 show a portion of a rotor-stator arrangement including a rotor 1 and a stator 2 as components of a fluid flow machine such as a gas turbine engine, which is not shown in its entirety. More specifically, FIG. 1 shows the rotor-stator arrangement 1, 2 in operation with the rotor 1 rotating in the direction R about an axis A, while FIG. 2 shows the rotor-stator arrangement 1, 2 at a standstill. As is well known, a fluid such as a hot gas flows through the turbine engine and exists at different prevailing pressures in a first space $R_1$ on one side of the rotor 1 and in a second space $R_2$ on a second side of the rotor 1. In order to provide a seal between the two different pressurized zones or spaces $R_1$ and $R_2$ around a gap between the rotating rotor 1 and the stationary stator 2, a brush seal 3 is arranged in this gap.

More specifically, the rotor 1 includes an axially extending part such as an annular or sleeve-shaped rim or flange 1' having an annular circumferential groove 7 formed therein concentrically about the axis A. An opening 8 of the circumferential groove 7 is adjacent and faces a portion or rim of the stator 2 across a circumferential axial gap, and the brush-seal 3 is arranged between the rotor 1 and the stator 2 in this gap. The brush seal 3 has a generally annular configuration arranged concentrically about the axis A. The brush seal 3 includes a bristle bundle of bristles 5 having respective fixed ends and free ends. The fixed ends of the bristles 5 are held in a seal housing 6, which in turn is held by a seal carrier 4, which is removably secured to the stator 2, for example by rivets 4A or bolts, at a location spaced axially from the rotor rim 1' across the axial gap. The free ends of the bristles 5 extend in a direction parallel and concentric to the axis A and protrude axially from the seal housing 6 to reach into the axis-concentric circumferential groove 7 in the rotor 1.

The groove 7 is bounded by a radially outer wall 9A, a radially inner wall 9B, and a base or end wall 10, while the axial opening 8 is opposite the base 10. The radially inner wall 9B and the radially outer wall 9A define therebetween a cylindrical section $A_Z$ of the groove 7 immediately adjacent the base 10, a wider cylindrical or a flaring section $A_O$ of the groove 7 adjacent the opening 8, and a conically or curvedly widening transition section $A_K$ between the two sections $A_Z$ and $A_O$. Finally, immediately at the opening 8, the circumferential rims 11A and 11B of the rotor rim 1' bounding the opening 8 are preferably rounded off on their edges facing the bristles 5 and the axial gap.

With consideration for relative movements between the rotor 1 and the stator 2 when transitioning from the resting standstill state to the normal operating state of the rotor, the circumferential groove 7 is positioned at approximately the same radial height or distance from the axis A as the brush seal 3, so that the seal bristles 5 reach into and end within the circumferential groove 7 in the rotor standstill condition as shown in FIG. 2. Particularly, in this standstill condition, the free ends of the bristles 5 terminate within the conical tapering section $A_K$ of the circumferential groove 7, which is basically formed due to the sloping or widening profile of the radially inner wall 9B and the radially outer wall 9A of the circumferential groove 7. In this context, the conically shaped groove section $A_K$ is configured in such a manner so that the bristles 5 are just barely touching or are spaced by a very slight spacing distance away from the radially outer conically profiled wall 9A in the standstill condition, so that the bristles 5 are contact-free or essentially contact-free relative to the rotor 1 at a standstill.

As the rotor 1 spins up to its normal operating rotational speed, and as the rotor 1 consequently heats up to its normal operating temperature, the rotor 1, and particularly its annular flange or rim 1' undergoes both a radially outward motion and an axial motion toward the stator 2, which together represent a diagonal motion relative to the stator 2 as represented by the motion direction arrow B in FIG. 1, due to the centrifugal forces, thermal expansion and fluid pressures acting on the rotor 1. In the normal operating condition shown in FIG. 1, the bristles 5 of the brush seal 3 reach further or deeper into the circumferential groove 7 due to the axial component of the motion B, in comparison to the axial position of the bristles 5 in the rotor standstill condition shown in FIG. 2. Thus, while the rotor is operating, the bristles 5 reach into and end in the furthest or deepest cylindrical section $A_Z$ with only a slight space between the free ends or tips of the bristles 5 and the base 10 of the circumferential groove 7 as shown in FIG. 1. Furthermore, due to the outward radial component of the motion B, the radially inner wall 9B of the circumferential groove 7 approaches closer to the bristles 5 whereby a spring characteristic or shape of the bristles 5 may have a tendency to push the bristles 5 into contact with the inner wall 9B at least in an intermittent manner. However, this tendency is counteracted by a boundary layer effect as will be described below, to achieve a contact-free or substantially contact-free (with only a few bristles intermittently contacting the wall) operation of the seal.

Since the bristles 5 are elastically flexible and thus somewhat yielding, any radially displaced, tilted or skewed position of the stator 2 relative to the rotor 1 arising due to the installation or operating conditions, will be compensated for by the yielding of the flexible bristles 5. It should also be noted that the bristles 5 may be directed with a slight circumferential tilt angle relative to a perfectly axis-parallel direction, in order to provide better compensation under some conditions. When the bristles 5 undergo flexing or yielding in this manner, the portions $A_K$ and $A_O$ of the circumferential groove 7 that become wider toward the opening 8, as well as the rounded-off outer edges or corners of the circumferential rims 11A or 11B are beneficial for helping to avoid undue wear of the bristles 5 along the edge or rim zone of the circumferential groove 7.

The seal housing 6 which holds the bristles 5 preferably includes two circumferential collars or bands 12A and 12B extending coaxially or concentrically in the axial direction and receiving the bristles 5 therebetween. The radial width and the axial length of the two circumferential bands 12A and 12B is embodied and adapted in such a manner that the bands 12A and 12B reach into the outer section $A_O$ and approximately up to the conical section $A_K$ of the circumferential groove 7, at least during the operation of the rotor 1 as shown in FIG. 1. In this manner, the bands 12A and 12B support the bristles 5, improve the gas flow conditions, and improve the seal effect.

Figure 3:
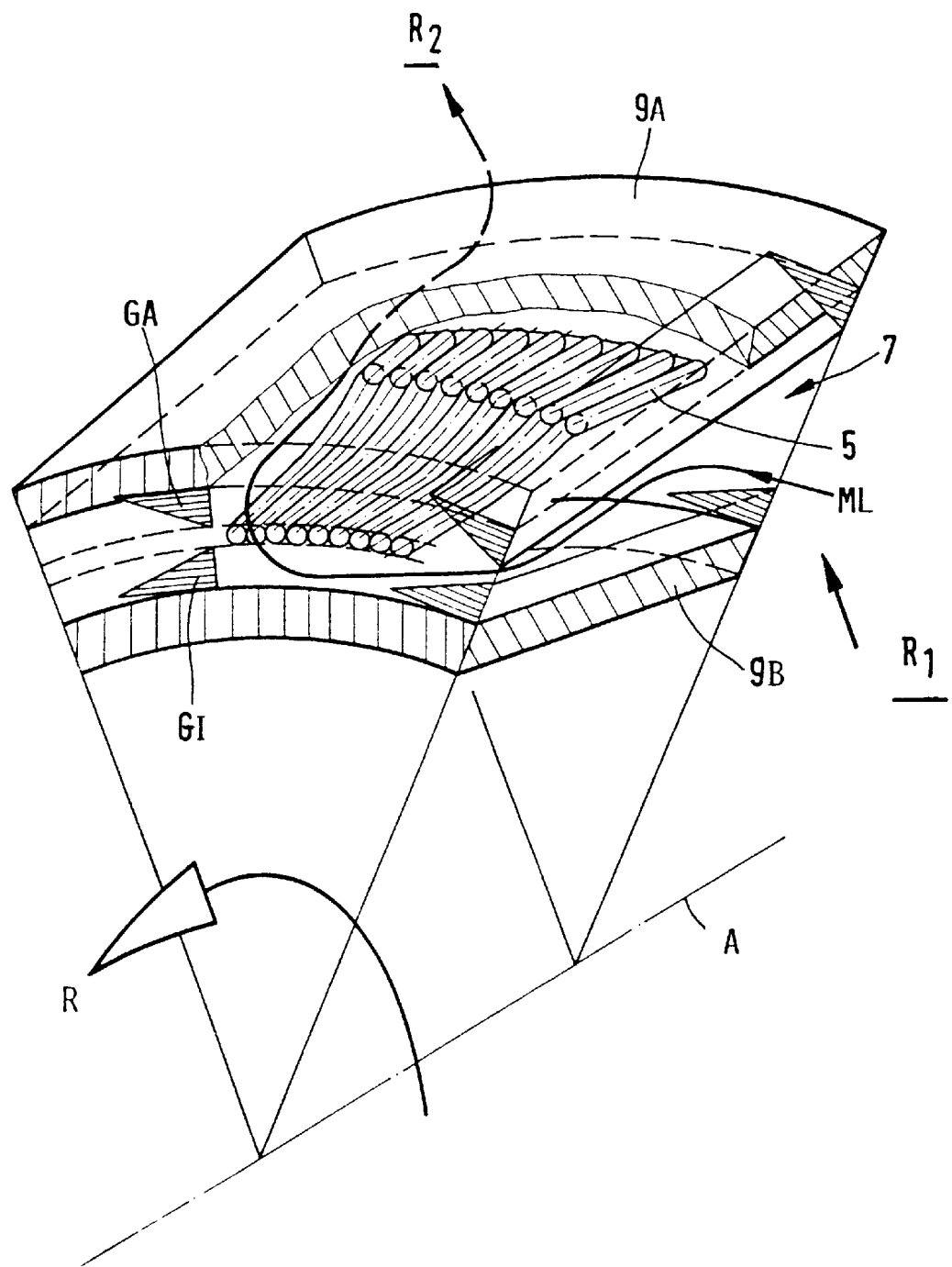
FIG. 3 is a perspective detail view of a portion of the rotor-stator arrangement according to FIG. 1, with the boundary layer schematically illustrated in the circumferential groove of the rotor.

FIG. 3 shows an enlarged perspective detail view of a section of the rotor-stator arrangement 1, 2 during operation thereof as shown in FIG. 1. FIG. 3 also schematically shows the formation and effect on the bristles 5 of the two boundary layers $G_A$ and $G_I$ formed along the radially outer and radially inner walls 9A and 9B of the circumferential groove 7 in the rotating rotor 1. More specifically, during operation of the rotor 1, an inner boundary layer $G_I$ is formed along the radially inner wall 9B, namely between the bristles 5 and the radially inner wall 9B, and an outer boundary layer $G_A$ is formed along the radially outer wall 9A, namely between the wall 9A and the bristles 5. These boundary layers $G_I$ and $G_A$ effectively adhere to the wall surfaces of the rotor 1 and thus rotate together with the rotor 1 in a circumferential direction.

Due to the formation of these boundary layers, and the resulting pressure conditions, kinetic energy and kinematic viscosity of the leakage flow ML that is to be sealed, the bristles 5 are caused to float up away from the radially inner wall 9B of the circumferential groove 7 and assume an operating position floating or hovering substantially centered between the two walls 9A and 9B. As can be seen, the groove 7 thus preferably has a radial width dimension at the free ends of the seal bristles that is no greater than the total of a radial thickness of the inner boundary layer $G_I$, a radial thickness of the outer boundary layer $G_A$ and a radial thickness of the plurality of seal bristles 5. With this arrangement, even if the bristles 5 are slightly bent or angled, and even if the bristles 5 originally contacted one or the other wall 9A or 9B in the standstill condition, the operation of the brush seal will be substantially contact-free under normal operating conditions.

Furthermore, the above-described boundary layer phenomena contribute to increasing the seal effectiveness by causing a throttle or baffle effect similar to that of a labyrinth seal, since the leakage flow ML will be deflected two times within the circumferential groove 7 between the walls 9A and 9B and the bristles 5, respectively, and have to penetrate through the boundary layers. This leads to a strong turbulence and energy dissipation of the leakage flow ML.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A seal arrangement for sealing a circumferential gap between a rotor and a stator of a rotary machine, comprising:
   a stator,
   a rotor arranged to be rotatable relative to said stator around a rotor axis, having a rotor rim adjacent said stator with a gap between said rotor rim and said stator, and having a circumferential groove extending concentrically about said rotor axis in said rotor rim and being bounded by two circumferential groove side walls, and
   a brush seal arranged in said gap, stationarily secured to said stator, and comprising a plurality of seal bristles that are arranged concentrically around said rotor axis, that each respectively extend substantially parallel to said rotor axis, and that have free ends reaching into said circumferential groove,
   wherein said rotor, said circumferential groove, and said brush seal including said seal bristles are so arranged and adapted that said free ends of said seal bristles are at least closer to one of said groove side walls than the other of said groove side walls when said rotor is at a standstill, and float away from and substantially do not contact said groove side walls when said rotor is rotating at an operating rotational speed.

2. The seal arrangement according to claim 1, wherein two spaces on opposite sides of said rotor are differently pressurized by a fluid, wherein said free ends of said seal bristles contact a radially inner one of said groove side walls when said rotor is at said standstill, and wherein said seal bristles have a contact force against said radially inner groove side wall and a spring characteristic that are so adapted depending on the physical characteristics of the fluid so that said bristles float away from and do not contact said groove side walls when said rotor is rotating at said operating rotational speed.

3. The seal arrangement according to claim 1, wherein said free ends of at least some of said seal bristles contact said one of said groove side walls when said rotor is at said standstill.

4. The seal arrangement according to claim 3, wherein said one of said groove side walls being contacted by said free ends of at least some of said seal bristles is a radially outer one of said groove side walls.

5. The seal arrangement according to claim 1, wherein said bristles are elastically flexible such that said bristles float away from said groove side walls when said rotor is rotating at said operating rotational speed.

6. The seal arrangement according to claim 1, wherein said circumferential groove is so configured and adapted such that at least one fluid boundary layer is formed between said free ends of said bristles and at least one of said groove side walls respectively when said rotor is rotating at said operating rotational speed, and wherein said bristles are so adapted such that said free ends of said bristles float away from said at least one of said groove side walls due to an influence of said boundary layer acting on said free ends of said bristles.

7. The seal arrangement according to claim 6, wherein said circumferential groove and said bristles are so configured, arranged and adapted such that said at least one fluid boundary layer includes an inner fluid boundary layer formed between said free ends of said bristles and a radially inner one of said groove side walls, and an outer fluid boundary layer formed between said free ends of said bristles and a radially outer one of said groove side walls, when said rotor is rotating at said operating rotational speed, and such that said free ends of said bristles are substantially centered between said radially inner and radially outer groove side walls due to an influence of said inner and outer boundary layers acting on said free ends of said bristles.

8. The seal arrangement according to claim 7, wherein said groove has a radial width dimension at said free ends of said seal bristles that is no greater than the total of a radial thickness of said inner fluid boundary layer, a radial thickness of said outer fluid boundary layer and a radial thickness of said plurality of seal bristles.

9. The seal arrangement according to claim 6, wherein said boundary layer is formed between said free ends of said bristles and a radially inner one of said groove side walls, wherein said bristles have an elastically flexible spring characteristic urging said free ends of said bristles toward said radially inner groove side wall, and wherein said influence of said boundary layer opposes said spring characteristic to cause said free ends of said bristles to float away from said radially inner groove side wall when said rotor is rotating at said operating rotational speed.

10. The seal arrangement according to claim 1, wherein said rotor is so configured and adapted such that said rotor rim moves radially outwardly relative to said stator and axially toward said stator when said rotor is rotated up to said operating rotational speed from said standstill.

11. The seal arrangement according to claim 1, wherein said circumferential groove has an annular opening facing toward said brush seal, and wherein at least a portion of said circumferential groove becomes radially wider toward said opening.

12. The seal arrangement according to claim 11, wherein said circumferential groove further includes another portion that has an essentially uniform continuous radial width over an axial length of said another portion and that is located immediately adjacent said opening.

13. The seal arrangement according to claim 1, wherein said circumferential groove includes a cylindrical groove portion, and wherein said free ends of said bristles terminate within said cylindrical groove portion.

14. The seal arrangement according to claim 13, wherein said circumferential groove has an annular opening facing toward said brush seal, wherein said circumferential groove is further bounded by a groove base extending between said groove side walls opposite said opening, and wherein said cylindrical groove portion is located spaced from said opening and immediately adjacent said groove base.

15. The seal arrangement according to claim 1, wherein said circumferential groove includes first and second cylindrical groove portions, and a third groove portion having a conically widening configuration located between said first and second cylindrical groove portions.

16. The seal arrangement according to claim 1, wherein said two circumferential groove side walls include a radially inner groove side wall and a radially outer groove side wall that are concentric with each other.

17. The seal arrangement according to claim 16, wherein at least one of said two groove side walls has a conically sloping configuration.

18. The seal arrangement according to claim 1, wherein said circumferential groove has an annular opening facing toward said brush seal, said rotor rim includes two axially projecting circumferential rims bounding said opening therebetween, and free ends of said circumferential rims are rounded-off at least on respective edges thereof facing said bristles so as to radially widen said circumferential groove directly at said opening.

19. The seal arrangement according to claim 1, wherein said brush seal further comprises a seal housing that receives fixed ends of said seal bristles therein and that is attached to said stator, and wherein said seal housing includes at least one of a radially inner circumferential collar and a radially outer circumferential collar extending alongside and guidingly supporting said seal bristles.

20. The seal arrangement according to claim 19, wherein said seal housing includes both said radially inner circumferential collar and said radially outer circumferential collar with said seal bristles arranged therebetween.

21. The seal arrangement according to claim 19, wherein said at least one circumferential collar reaches into said circumferential groove at least when said rotor is rotating at said operating rotational speed.

22. The seal arrangement according to claim 1, wherein said brush seal is removably connected to said stator.

23. The seal arrangement according to claim 1, wherein said circumferential groove has an annular opening facing said gap and a groove base extending between said two circumferential groove side walls opposite said opening, wherein said groove side walls and said groove base rotate with said rotor relative to said bristles which are fixed to said stator, and wherein said free ends of said seal bristles terminate proximate said groove base with a leakage gap therebetween.

24. The seal arrangement according to claim 1, wherein said arrangement operates without contact between said bristles and said rotor.

* * * * *